United States Patent
Xing et al.

(10) Patent No.: US 11,884,440 B2
(45) Date of Patent: Jan. 30, 2024

(54) METHOD, APPARATUS, DEVICE AND STORAGE MEDIUM FOR CONTROLLING PASTE SQUEEZE DEVICE

(71) Applicant: BEIJING XIAOMI MOBILE SOFTWARE CO., LTD., Beijing (CN)

(72) Inventors: Zheng Xing, Beijing (CN); Yingchun Xie, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 858 days.

(21) Appl. No.: 16/920,731

(22) Filed: Jul. 5, 2020

(65) Prior Publication Data

US 2021/0206527 A1 Jul. 8, 2021

(30) Foreign Application Priority Data

Jan. 7, 2020 (CN) .......................... 202010015535.1

(51) Int. Cl.
*B65B 69/00* (2006.01)
*A45D 40/00* (2006.01)

(52) U.S. Cl.
CPC ............ *B65B 69/005* (2013.01); *A45D 40/00* (2013.01); *A45D 2200/052* (2013.01); *A45D 2200/054* (2013.01)

(58) Field of Classification Search
CPC ......................... B05C 11/1036; A47K 5/1217
See application file for complete search history.

(56) References Cited

U.S. PATENT DOCUMENTS

| | | | | |
|---|---|---|---|---|
| 2003/0089423 | A1* | 5/2003 | Barton | B67D 1/0888 141/198 |
| 2005/0229973 | A1 | 10/2005 | Holm | |
| 2009/0267776 | A1* | 10/2009 | Glenn | G16H 40/20 340/573.1 |
| 2013/0112713 | A1 | 5/2013 | Ellis | |
| 2018/0184857 | A1* | 7/2018 | Pai | A46B 3/005 |

(Continued)

FOREIGN PATENT DOCUMENTS

| | | |
|---|---|---|
| CN | 202634587 U | 12/2012 |
| CN | 105298229 A | 2/2016 |

(Continued)

OTHER PUBLICATIONS

Extended European Search Report in Application No. 20189650.3, dated Feb. 10, 2021.

(Continued)

*Primary Examiner* — Timothy R Waggoner
(74) *Attorney, Agent, or Firm* — Syncoda LLC; Feng Ma

(57) ABSTRACT

A method for controlling a paste squeeze device includes: identifying identity information of a user approaching the paste squeeze device; acquiring target usage information corresponding to the identity information, the target usage information including a target paste type and a target usage amount; and controlling the paste squeeze controller on the storage part storing a paste of the target paste type to squeeze out a paste of the target usage amount. The paste squeeze controller on the corresponding storage part can be controlled to squeeze out the paste of a target usage amount based on the identity information of different users, thereby providing accurate amount of paste specific to the individual user.

18 Claims, 10 Drawing Sheets

(56) References Cited

U.S. PATENT DOCUMENTS

| | | | |
|---|---|---|---|
| 2018/0206612 A1 | | 7/2018 | Bartholomew et al. |
| 2019/0087510 A1 | | 3/2019 | Rexach et al. |
| 2021/0110736 A1 | * | 4/2021 | Felder .................. A61C 17/224 |

FOREIGN PATENT DOCUMENTS

| | | | | | |
|---|---|---|---|---|---|
| CN | 105885153 | A | | 8/2016 | |
| CN | 205433515 | U | | 8/2016 | |
| CN | 206402496 | U | | 8/2017 | |
| CN | 108158455 | A | | 6/2018 | |
| CN | 108398890 | A | * | 8/2018 | ............ G05B 19/04 |
| CN | 108398890 | A | | 8/2018 | |
| CN | 109091047 | A | | 12/2018 | |
| CN | 110247881 | A | | 9/2019 | |
| DE | 102006025652 | A1 | | 8/2007 | |

OTHER PUBLICATIONS

China first office action in Application No. 202010015535.1, dated Apr. 28, 2021.
China first office action in Application No. 202010015535.1, dated Nov. 30, 2021.

* cited by examiner

METHOD, APPARATUS, DEVICE AND STORAGE MEDIUM FOR CONTROLLING PASTE SQUEEZE DEVICE

CROSS-REFERENCE TO RELATED APPLICATION

This application claims priority to Chinese Patent Application No. 202010015535.1 filed on Jan. 7, 2020, the disclosure of which is hereby incorporated by reference in its entirety.

BACKGROUND

An automatic toothpaste squeeze apparatus can help squeezing out toothpaste from its container based on manual and mechanical approaches, such as by squeezing out the desired toothpaste by pushing the toothbrush into a toothbrush inlet and touching the squeeze button.

SUMMARY

Various embodiments of the present disclosure provide a method, an apparatus, a device and a storage medium for controlling a paste squeeze device.

According to a first aspect of an embodiment of the present disclosure, there is provided a method for controlling a paste squeeze device, wherein the paste squeeze device includes a storage part of at least one type of paste, and a paste squeeze controller provided on the storage part; the method includes:
identifying identity information of a user approaching the paste squeeze device;
acquiring target usage information corresponding to the identity information, the target usage information including a target paste type and a target usage amount; and
controlling the paste squeeze controller on the storage part storing a paste of the target paste type to squeeze out a paste of the target usage amount.

According to a second aspect of an embodiment of the present disclosure, there is provided an apparatus for controlling a paste squeeze device, wherein the paste squeeze device includes a storage part of at least one type of paste, and a paste squeeze controller provided on the storage part; the apparatus includes:
an identity information recognition module, configured to identify identity information of a user approaching the paste squeeze device;
a usage information acquisition module, configured to acquire target usage information corresponding to the identity information, the target usage information including a target paste type and a target usage amount; and
a type and usage amount control module, configured to control the paste squeeze controller on the storage part storing a paste of the target paste type to squeeze out a paste of the target usage amount.

According to a third aspect of an embodiment of the present disclosure, there is provided a device for controlling a paste squeeze device, wherein the paste squeeze device includes a storage part of at least one type of paste, and a paste squeeze controller provided on the storage part; the control device includes:
a processor, and a memory for storing instructions executable by the processor,
wherein, the processor is configured to perform:
identifying identity information of a user approaching the paste squeeze device;
acquiring target usage information corresponding to the identity information, the target usage information including a target paste type and a target usage amount; and
controlling the paste squeeze controller on the storage part storing a paste of the target paste type to squeeze out a paste of the target usage amount.

According to a fourth aspect of an embodiment of the present disclosure, there is provided a computer-readable storage medium, having a computer program stored thereon, wherein the program implements following steps when executed by a processor:
identifying identity information of a user approaching the paste squeeze device;
acquiring target usage information corresponding to the identity information, the target usage information including a target paste type and a target usage amount; and
controlling the paste squeeze controller on the storage part storing a paste of the target paste type to squeeze out a paste of the target usage amount.

It should be noted that the above general description and the following detailed description are merely exemplary and explanatory and should not be construed as limiting of the disclosure.

BRIEF DESCRIPTION OF THE DRAWINGS

The accompanying drawings, which are incorporated in the specification and constitute a part of the specification, show exemplary embodiments of the present disclosure. The drawings along with the specification explain the principles of the present disclosure.

DETAILED DESCRIPTION

Figure 1:
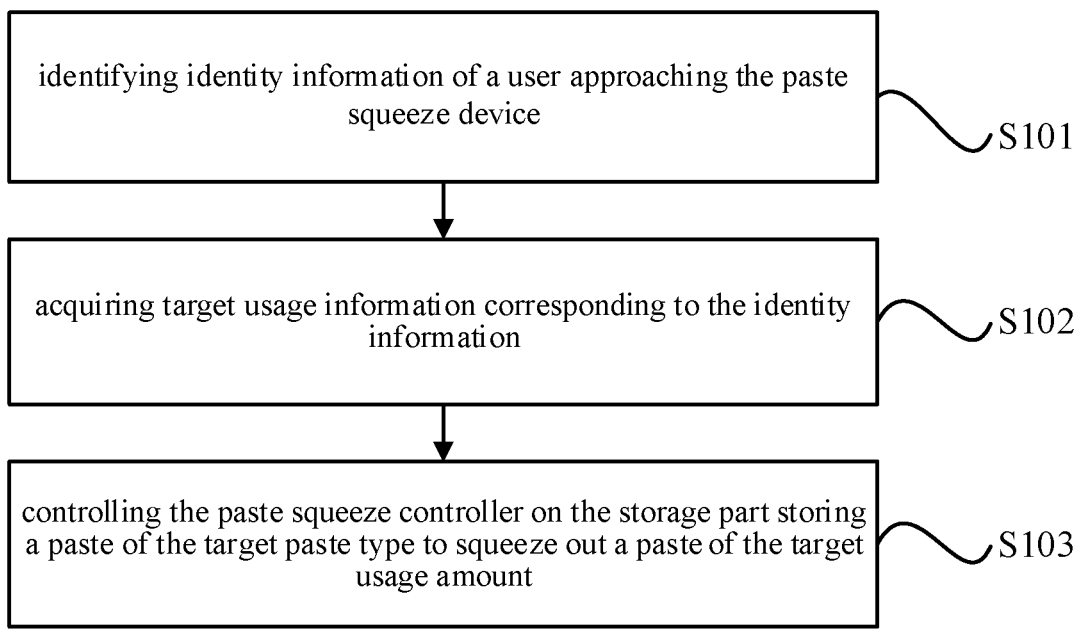
FIG. 1 is a flowchart of a method for controlling a paste squeeze device according to the first exemplary embodiment.

Exemplary embodiments will be described in detail herein, examples of which are illustrated in the accompanying drawings. When referring to the drawings below, the same numerals in different drawings represent the same or similar elements, unless otherwise indicated. The implementations described in the following exemplary embodiments do not represent all implementations consistent with the present disclosure. Instead, they are merely examples of apparatuses and methods consistent with aspects of the present disclosure as detailed in the appended claims.

An automatic toothpaste with manual and mechanical control may require a very accurate pressing force. For example, if the force is not properly controlled, it is likely to squeeze out the toothpaste less or more than the desired amount.

FIG. 1 is a flowchart of a method for controlling a paste squeeze device according to the first exemplary embodiment. The control of the paste squeeze device of this embodiment can be applied to a control unit (for example, micro-processing unit, MCU, etc.) of the paste squeeze device. The paste squeeze device includes a storage part of at least one type of paste, and a paste squeeze controller provided on the storage part. As shown in FIG. 1, the method includes following steps S101-S103.

In step S101, identity information of a user approaching the paste squeeze device is identified.

In this embodiment, when the user needs to use the paste, the user usually approaches the paste squeeze device. At this time, the above control unit may recognize the identity information of the user who approaches the paste squeeze device. The paste may include toothpaste, shampoo, facial cleanser, liquid soap, etc., which is not limited in these embodiments.

In an embodiment, the manner for identifying identity information of the user may include recognizing based on a human face or recognizing based on an electronic device worn by the user, which is not limited in this embodiment.

For example, if identity information of the user is recognized based on the face recognition manner, it may be determined that the current user approaches the paste squeeze device when a face recognition apparatus installed on the paste squeeze device can collect face image information of the user. Similarly, if identity information of the user is recognized based on the electronic device worn by the user, it can be determined that the current user approaches the paste squeeze device when a near field communication NFC chip on the paste squeeze device detects information of an electronic device worn by the user.

In another embodiment, the manner of identifying identity information of a user approaching the paste squeeze device may also refer to the embodiment shown in FIG. 4A described below, which will not be described in detail herein.

In step S102, target usage information corresponding to the identity information is acquired, the target usage information including a target paste type and a target usage amount.

In this embodiment, after the identity information of the user who approaches the paste squeeze device is identified, target usage information corresponding to the identity information may be acquired, and the target usage information includes a target paste type and a target usage amount.

For example, after the identity information of the user who approaches the paste squeeze device is identified, the target usage information corresponding to the identity information can be acquired based on the correspondence between the user identity information and the paste usage information established in advance. The target usage information includes the target paste type and the target usage amount of the user currently approaching the paste squeeze device.

In an embodiment, the correspondence between the user identity information and the paste usage information may be stored in the memory of the paste squeeze device, or may be stored in an electronic device associated with the paste squeeze device, which is not limited by this embodiment. For example, if the above correspondence is stored in the electronic device associated with the paste squeeze device, after identity information of the user is identified, the identity information may be sent to the electronic device associated with the paste squeeze device, and then the target usage information corresponding to the identity information returned by the electronic device is acquired.

In step S103, the paste squeeze controller on the storage part storing a paste of the target paste type is controlled to squeeze out a paste of the target usage amount.

In this embodiment, after the target usage information corresponding to the identity information is acquired, the paste squeeze controller on the storage part storing a paste of the target paste type may be controlled based on the target usage information, to squeeze out a paste of the target usage amount.

As can be seen from the above description, in this embodiment, by identifying identity information of a user approaching the paste squeeze device, and acquiring target usage information corresponding to the identity information, the target usage information including a target paste type and a target usage amount, it may achieve controlling the paste squeeze controller on the storage part storing a paste of the target paste type to squeeze out a paste of the target usage amount. Since the corresponding target usage information is acquired based on identity information of the user, it can achieve controlling the paste squeeze controller on the corresponding storage part to squeeze out the paste of a target usage amount based on the identity information of different users. Compared with the traditional way of squeezing out toothpaste by manual and mechanical transmission, it can reasonably control the type and usage amount of squeezing the paste, avoid squeezing out the amount of the paste less or more, and satisfy paste usage demand of the user.

Figure 2A:
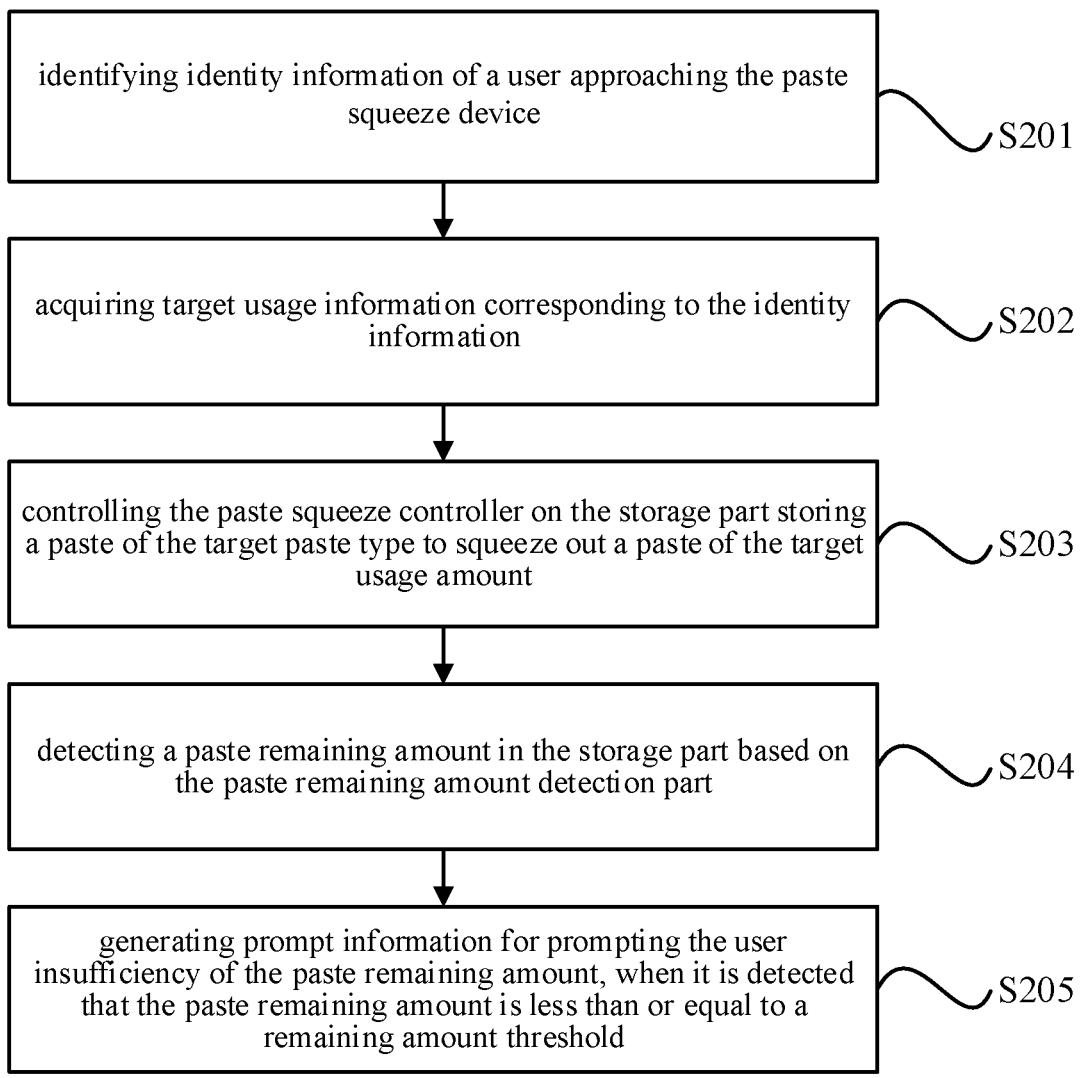
FIG. 2A is a flowchart of a method for controlling a paste squeeze device according to the second exemplary embodiment.
Figure 2B:
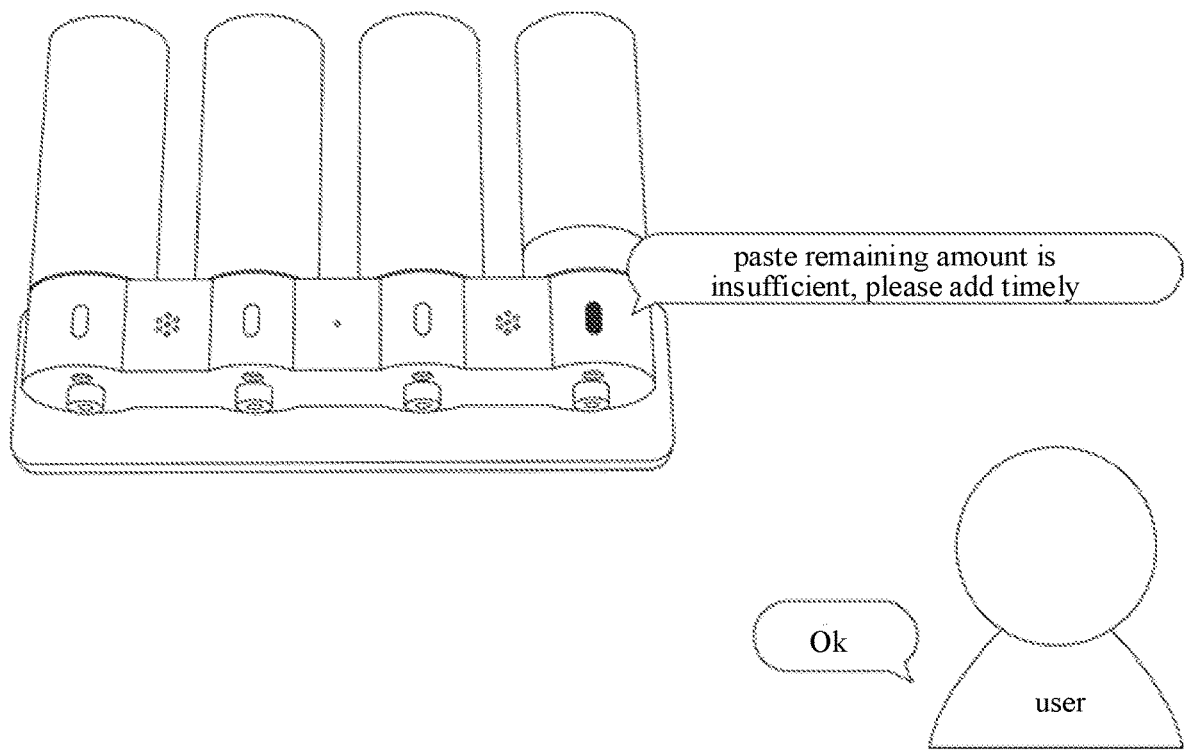
FIG. 2B is a schematic diagram of an application scenario for identifying identity information of a user who approaches a paste squeeze device according to an exemplary embodiment.

FIG. 2A is a flowchart of a method for controlling a paste squeeze device according to the second exemplary embodiment; and FIG. 2B is a schematic diagram of an application scenario for identifying identity information of a user who approaches a paste squeeze device according to an exemplary embodiment.

The control of the paste squeeze device of this embodiment can be applied to a control unit (for example, micro-processing unit, MCU, etc.) of the paste squeeze device. The paste squeeze device includes a storage part of at least one type of paste, and a paste squeeze controller provided on the storage part. A paste remaining amount detection part may be provided on the storage part of each type of paste. As shown in FIG. 2A, the method includes following steps S201-S205.

In step S201, identity information of a user approaching the paste squeeze device is identified.

In step S202, target usage information corresponding to the identity information is acquired. The target usage information includes a target paste type and a target usage amount.

In step S203, the paste squeeze controller on the storage part storing a paste of the target paste type is controlled to squeeze out a paste of the target usage amount.

For relevant explanations and descriptions of steps S201-S203, reference may be made to the foregoing embodiment, and details are not described herein.

In step S204, a paste remaining amount in the storage part is detected based on the paste remaining amount detection part.

In this embodiment, when the paste squeeze controller on the storage part storing a paste of the target paste type is controlled to squeeze out a paste of the target usage amount, a paste remaining amount in the storage part may be detected based on the paste remaining amount detection part.

It is worth noting that the type of the remaining amount detection part can be set by a developer according to actual business needs, such as, set as a weight detection part or a volume detection part, etc., which is not limited in this embodiment.

In step S205, prompt information for prompting the user insufficiency of the paste remaining amount is generated, when it is detected that the paste remaining amount is less than or equal to a remaining amount threshold.

In this embodiment, when the paste remaining amount in the storage part is detected based on the paste remaining amount detection part, it can be detected that the paste remaining amount is less than or equal to a remaining amount threshold. That is, the paste remaining amount may be compared with the set remaining amount threshold. Further, when it is detected that the paste remaining amount is less than or equal to the remaining amount threshold, prompt information for prompting the user insufficiency of the paste remaining amount is generated.

In an embodiment, a content and form of the above prompt information may be set based on actual needs, for example, "The paste remaining amount is insufficient, please add timely" as shown in FIG. 2B, which is not limited in this embodiment.

It is worth noting that, the above remaining amount threshold can be freely set by a developer or user, for example, set as a specific weight, volume, or set as a set percentage (e.g., 10%) of capacity of the storage part, which is not limited in the present embodiment.

As can be seen from the above description, in this embodiment, a paste remaining amount in the storage part is detected based on the paste remaining amount detection part, and when it is detected that the paste remaining amount is less than or equal to the remaining amount threshold, prompt information for prompting the user insufficiency of the paste remaining amount is generated, which not only reasonably controls the type and usage amount of squeezing the paste, but also timely reminds the user insufficiency of the paste remaining amount, thus improving the user experience.

Figure 3A:
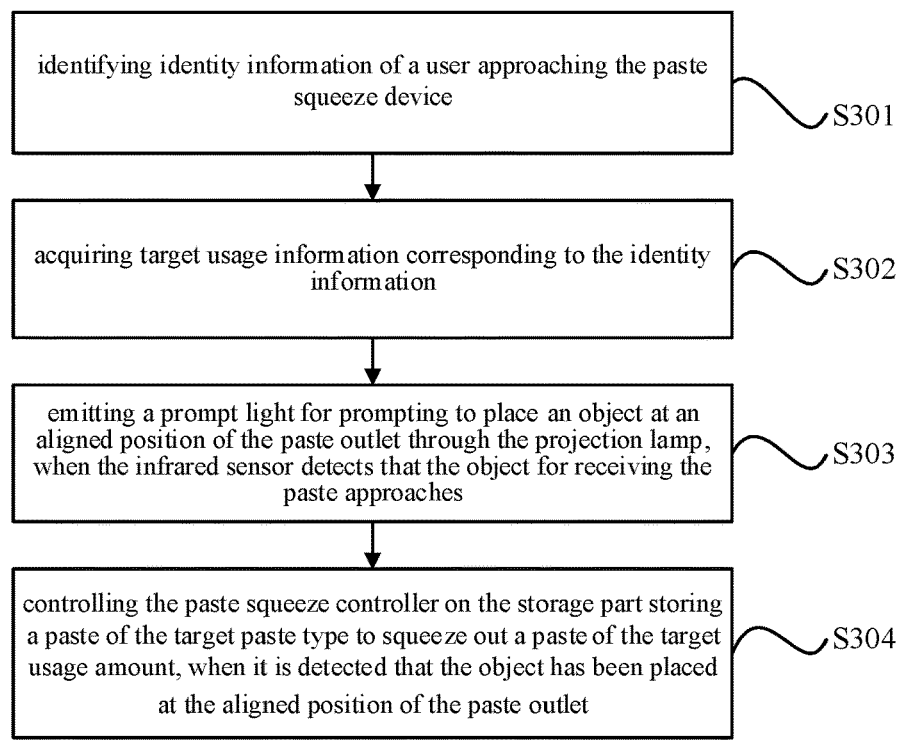
FIG. 3A is a flowchart of a method for controlling a paste squeeze device according to the third exemplary embodiment.

FIG. 3A is a flowchart of a method for controlling a paste squeeze device according to the third exemplary embodiment. The control of the paste squeeze device of this embodiment can be applied to a control unit (for example, micro-processing unit, MCU, etc.) of the paste squeeze device. The paste squeeze device includes a storage part of at least one type of paste, and a paste squeeze controller provided on the storage part. A projection lamp and an infrared sensor are provided at a set position on the storage part of each paste beside a paste outlet. As shown in FIG. 3A, the method includes following steps S301-S304.

In step S301, identity information of a user approaching the paste squeeze device is identified.

In step S302, target usage information corresponding to the identity information is acquired. The target usage information includes a target paste type and a target usage amount.

For relevant explanations and descriptions of steps S301-S302, reference may be made to the foregoing embodiment, and details are not described herein.

In step S303, the projection lamp emits a prompt light for prompting to place an object at an aligned position of the paste outlet, when the infrared sensor detects that the object for receiving the paste approaches.

In this embodiment, after the target usage information corresponding to the above identity information is acquired, the infrared sensor can detect the object for receiving the paste. If the infrared sensor detects that the object approaches, a prompt light can be emitted through the projection lamp, to prompt to place the object at the aligned position of the paste outlet.

Figure 3B:
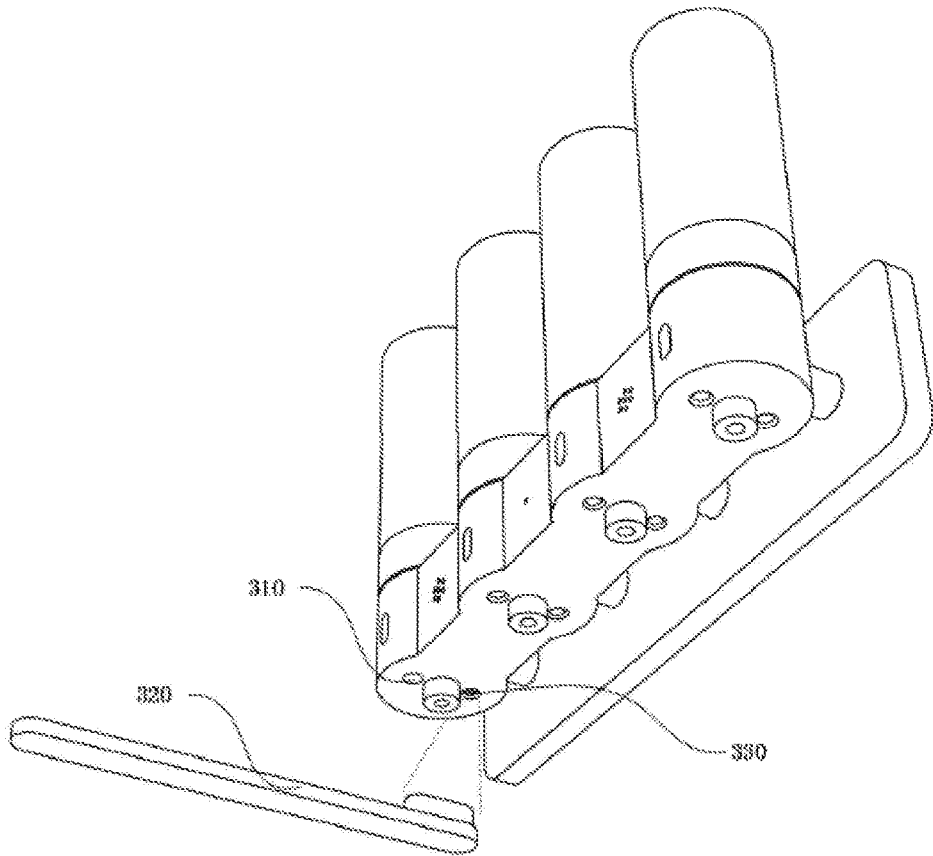
FIG. 3B is a schematic diagram of an application scene showing a prompt light emitted by a projection lamp according to an exemplary embodiment.

For example, FIG. 3B is a schematic diagram of an application scene showing a prompt light emitted by a projection lamp according to an exemplary embodiment. As shown in FIG. 3B, after the target usage information corresponding to the above identity information is acquired, the infrared sensor 310 can detect the object 320 for receiving the paste. If the infrared sensor 310 detects that the object 320 approaches, a prompt light can be emitted through the projection lamp 330, to prompt to place the object at the aligned position of the paste outlet, i.e., the position corresponding to the dotted line range shown in FIG. 3B.

In an embodiment, the object for receiving the paste may depend on the type of paste. For example, if the paste is toothpaste, the corresponding object for receiving the paste may be a toothbrush. Similarly, if the paste is shampoo or facial cleanser, etc., the corresponding object for receiving the paste may be a hand of a person.

In step S304, the paste squeeze controller on the storage part storing a paste of the target paste type is controlled to squeeze out a paste of the target usage amount, when it is detected that the object has been placed at the aligned position of the paste outlet.

In this embodiment, after the projection lamp emits a prompt light for prompting to place an object at an aligned position of the paste outlet, and when it is detected that the object has been placed at the aligned position of the paste outlet, the paste squeeze controller on the storage part storing a paste of the target paste type may be controlled to squeeze out a paste of the target usage amount.

It can be seen from the above description that, in this embodiment, when the infrared sensor detects that the object for receiving the paste approaches, the projection lamp emits a prompt light for prompting to place an object at an aligned position of the paste outlet, and then when it is detected that the object has been placed at the aligned position of the paste outlet, the operation of controlling the paste squeeze controller on the storage part storing a paste of the target paste type is performed to squeeze out a paste of the target usage amount, which can ensure that the paste is squeezed out when the object for receiving the paste is aligned with the paste outlet, prevent the paste from being missed and waste of the paste, and then meet needs of the user.

Figure 4A:
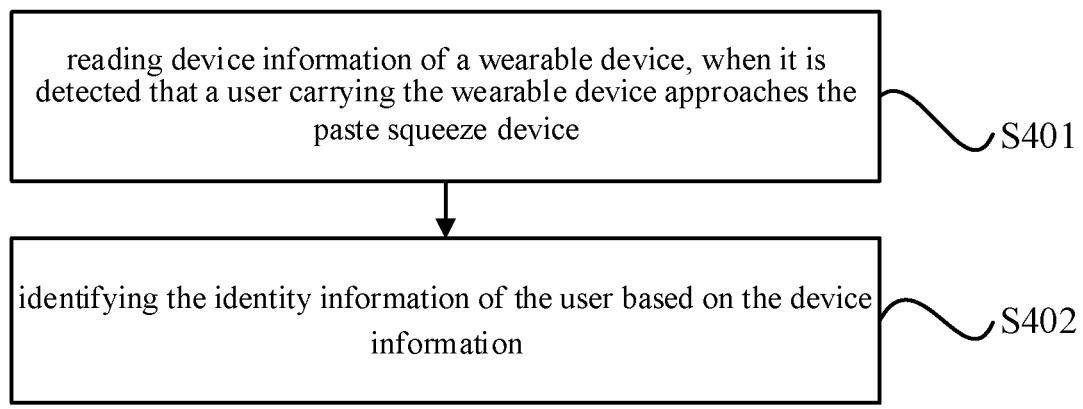
FIG. 4A is a flow chart showing how to identify the identity information of a user approaching the paste squeeze device according to an exemplary embodiment.
Figure 4B:
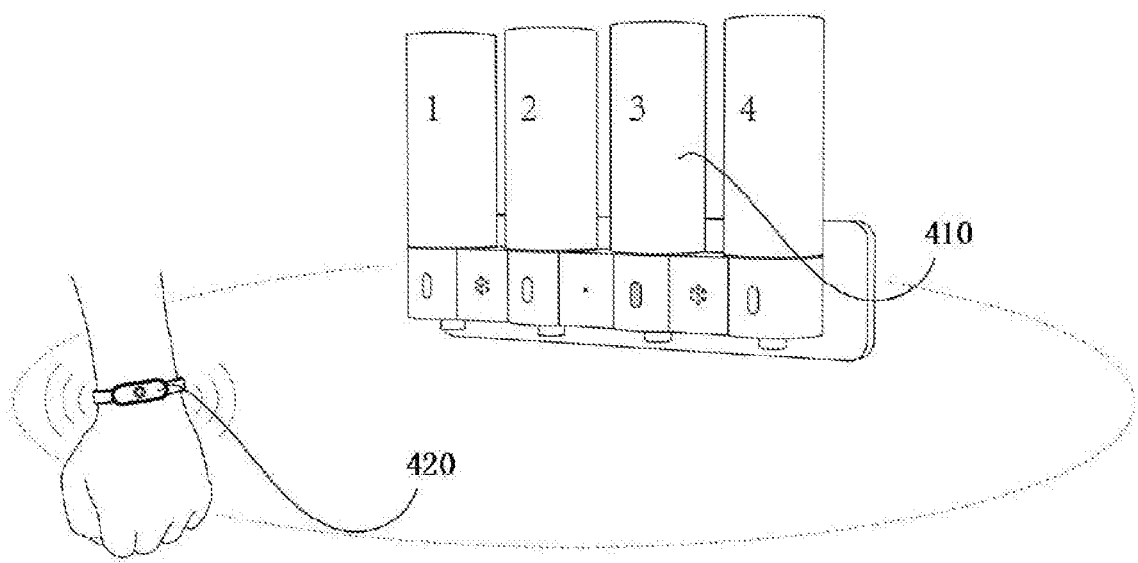
FIG. 4B is a schematic diagram of an application scenario for identifying identity information of a user who approaches a paste squeeze device according to an exemplary embodiment.

FIG. 4A is a flow chart showing how to identify the identity information of a user approaching the paste squeeze device according to an exemplary embodiment; FIG. 4B is a schematic diagram of an application scenario for identifying identity information of a user who approaches a paste squeeze device according to an exemplary embodiment.

This embodiment makes illustrative description by using an example of how to identify the identity information of a user who approaches the paste squeeze device, based on the above-mentioned embodiments. As shown in FIG. 4A, the step S101 of identifying identity information of a user approaching the paste squeeze device may include following steps S401-S402.

In step S401, device information of a wearable device is read, when it is detected that a user carrying the wearable device approaches the paste squeeze device.

As shown in FIG. 4B, when the control unit of the paste squeeze device 410 detects that the user carrying the wearable device 420 approaches the paste squeeze device, the device information of the wearable device may be read.

In an embodiment, the control unit may read the device information of the wearable device based on the communication connection established with the wearable device.

It is worth noting that the type of the above-mentioned communication connection can be freely set based on actual business needs, such as set as Bluetooth, infrared, Wi-Fi, or near field communication NFC, etc., which is not limited in this embodiment.

In step S402, the identity information of the user is identified based on the device information.

In this embodiment, after reading the device information of the wearable device, the control unit may identify identity information of the user based on the device information.

In an embodiment, the control unit may identify the identity information of the user currently approaching the paste squeeze device based on the correspondence between the device information and the identity information of the user established in advance.

The correspondence between the device information and the identity information of the user may be stored in the memory of the paste squeeze device, or may be stored in an electronic device associated with the paste squeeze device, which is not limited in this embodiment. For example, if the above correspondence is stored in an electronic device associated with the paste squeeze device, after the device information of the wearable device is read, the device information may be sent to the electronic device associated with the paste squeeze device, and then the identity information of the user returned by the electronic device may be acquired.

As can be seen from the above description, in this embodiment, when it is detected that a user carrying a wearable device approaches the paste squeeze device, the device information of the wearable device is read, and the identity information of the user is identified based on the device information, which can accurately identify identity information of the user based on the wearable device worn by the user, and then determine the type and usage amount of the paste used by the user based on identity information of the user. Besides, the paste squeeze controller on the storage part storing a paste of the target paste type is controlled to squeeze out a paste of the target usage amount, which can reasonably control the type and usage amount of squeezing the paste, avoid squeezing out the amount of the paste less or more, and satisfy paste usage demand of the user.

Figure 5A:
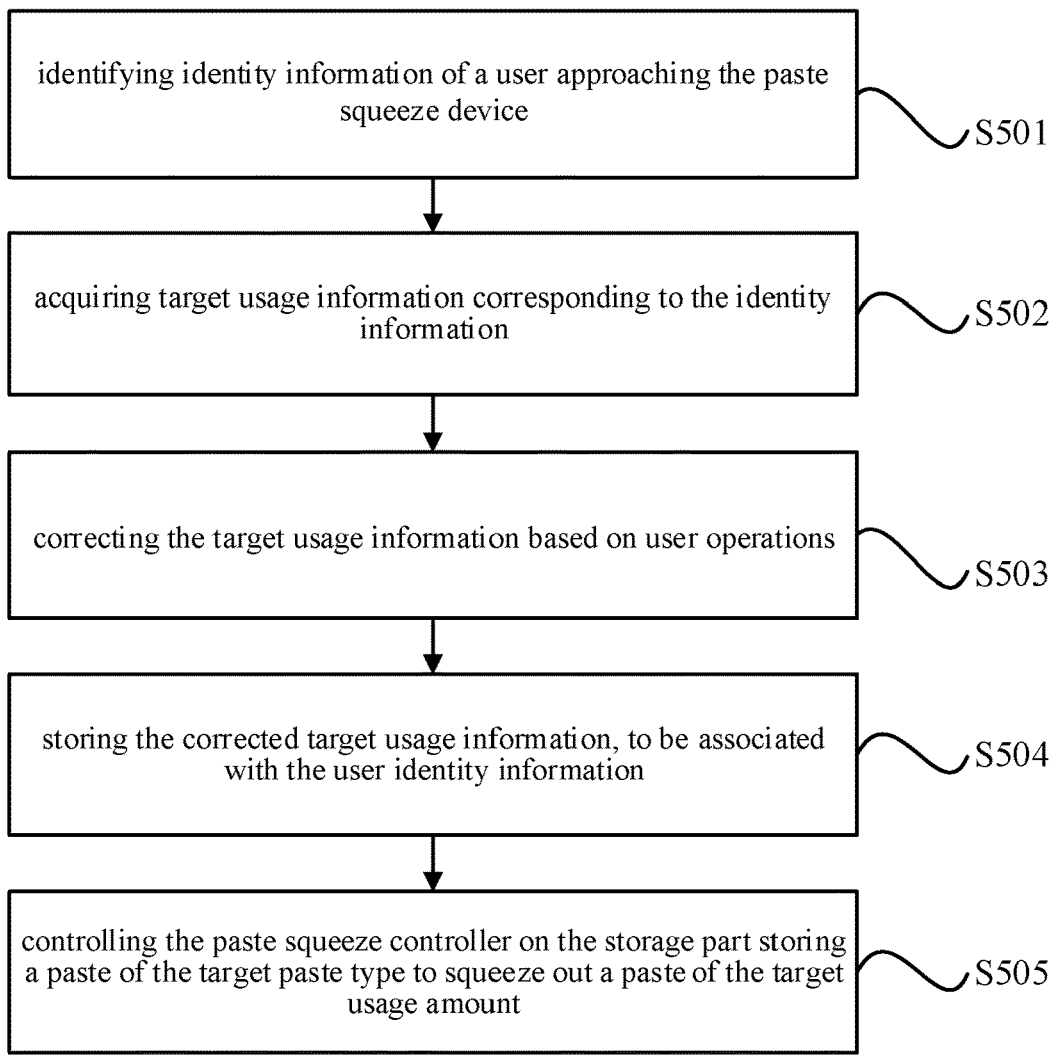
FIG. 5A is a flowchart of a method for controlling a paste squeeze device according to the fourth exemplary embodiment.
Figure 5B:
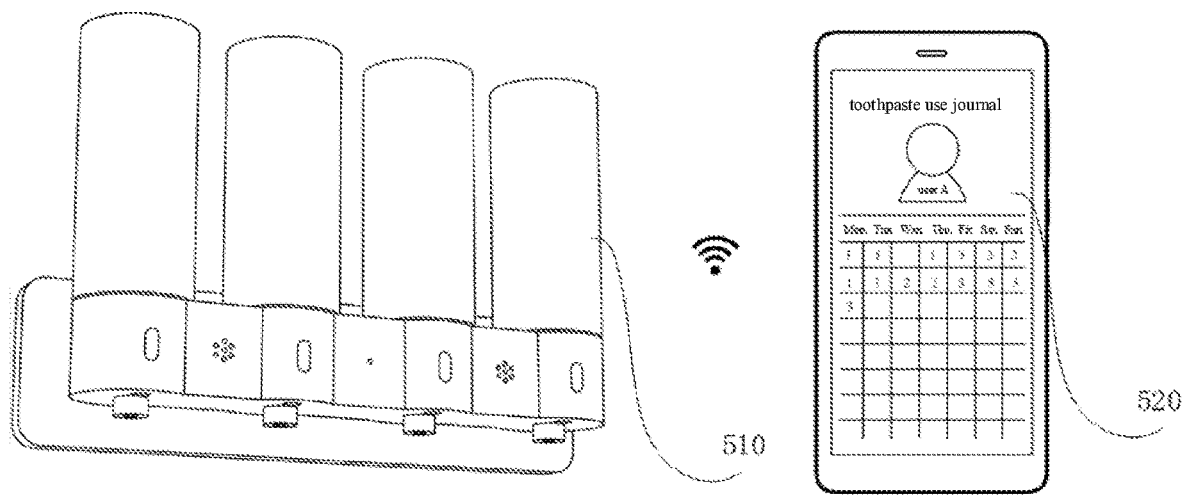
FIG. 5B is a schematic diagram of an application scenario of correcting target usage information based on a smartphone according to an exemplary embodiment.

FIG. 5A is a flowchart of a method for controlling a paste squeeze device according to the fourth exemplary embodiment; and FIG. 5B is a schematic diagram of an application scenario of correcting target usage information based on a smartphone according to an exemplary embodiment. The control of the paste squeeze device of this embodiment can be applied to a control unit (for example, micro-processing unit, MCU, etc.) of the paste squeeze device. The paste squeeze device includes a storage part of at least one type of paste, and a paste squeeze controller provided on the storage part. As shown in FIG. 5A, the method includes following steps S501-S505.

In step S501, identity information of a user approaching the paste squeeze device is identified.

In step S502, target usage information corresponding to the identity information is acquired.

The target usage information includes a target paste type and a target usage amount.

In step S503, the target usage information is corrected based on user operations.

In this embodiment, after the target usage information corresponding to the identity information is acquired, the target usage information may be corrected based on user operations, such that the corrected target usage information more meets actual needs of the user.

As shown in FIG. 5B, after the identity information of the user approaching the paste squeeze device 510 is identified and the target usage information corresponding to the identity information is acquired, the above target usage information may be corrected based on the user operations performed on the electronic device 520 associated with the paste squeeze device.

For example, the above manner of correcting the target usage information includes correcting at least one of the target paste type and the target usage amount.

In step S504, the corrected target usage information is stored, to be associated with the user identity information.

In this embodiment, after the target usage information is corrected based on user operations, the corrected target usage information may be stored, to be associated with the user identity information. On this basis, when it is detected that the current user approaches the paste squeeze device the next time, the corrected target usage information may be acquired, and then the type and usage amount of the squeeze paste can be controlled based on the usage information.

In step S505, the paste squeeze controller on the storage part storing a paste of the target paste type is controlled to squeeze out a paste of the target usage amount.

For relevant explanations and descriptions of steps S501-S502 and S505, reference may be made to the foregoing embodiment, and details are not described herein.

As can be seen from the above description, in this embodiment, by correcting the target usage information based on user operations, and storing the corrected target usage information to be associated with the user identity information, it can correct the target usage information of the user based on the actual requirements of the user, and then the type and usage amount of the squeeze paste can be controlled based on the corrected target usage information, and requirements of users may be met.

Figure 6A:
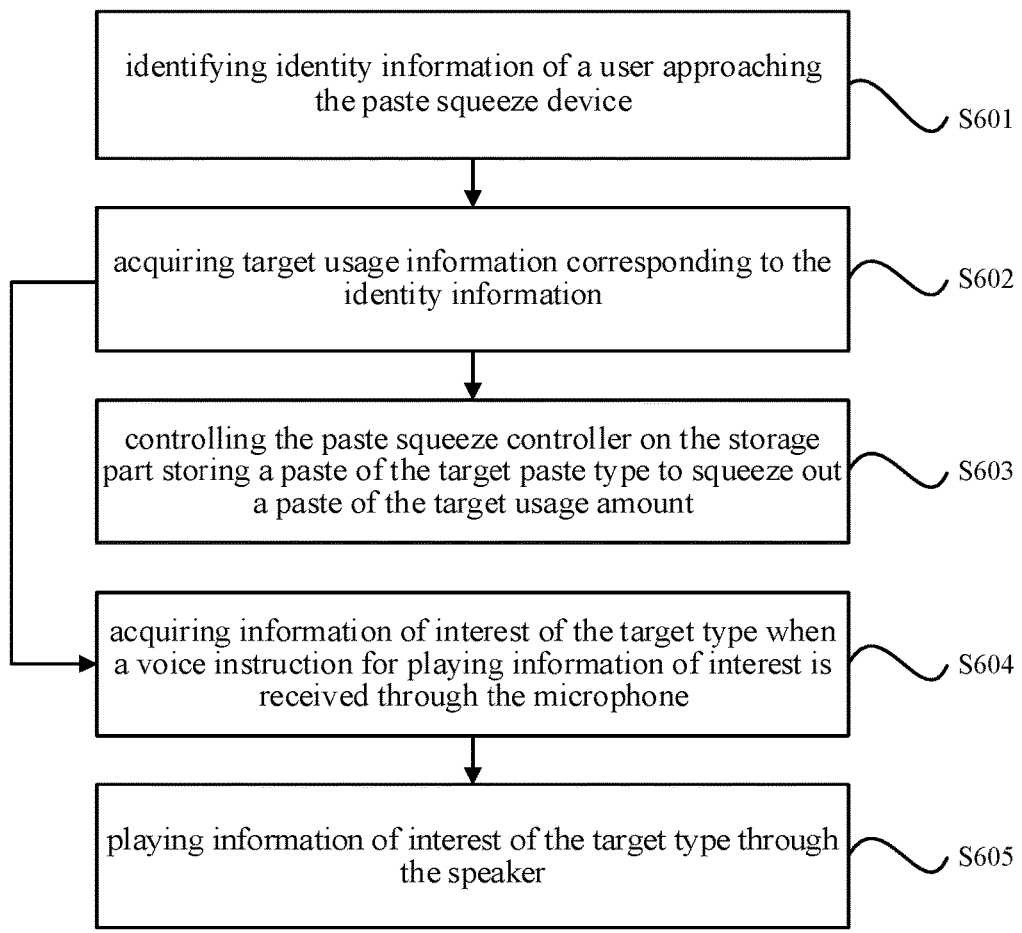
FIG. 6A is a flowchart of a method for controlling a paste squeeze device according to the fifth exemplary embodiment.
Figure 6B:
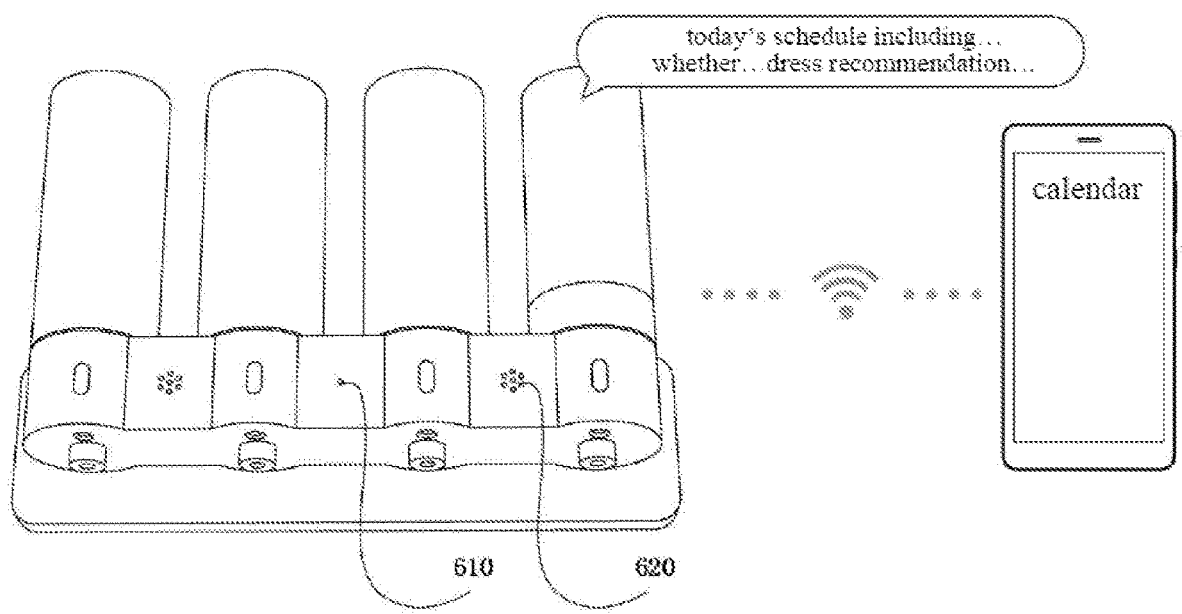
FIG. 6B is a schematic diagram of an application scenario of a paste squeeze device playing information of interest according to an exemplary embodiment.
Figure 6C:
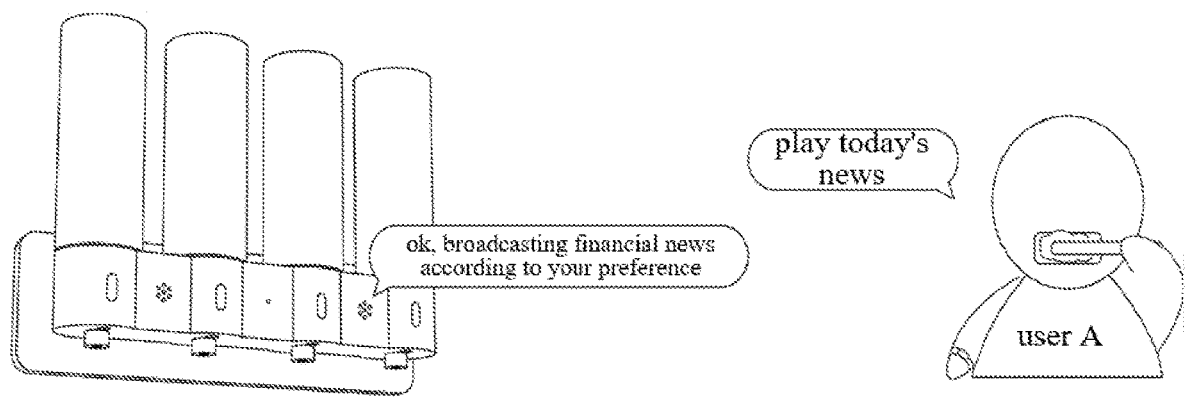
FIG. 6C is a schematic diagram of an application scenario of a paste squeeze device playing information of interest according to another exemplary embodiment.

FIG. 6A is a flowchart of a method for controlling a paste squeeze device according to the fifth exemplary embodiment; FIG. 6B is a schematic diagram of an application scenario of a paste squeeze device playing information of interest according to an exemplary embodiment; and FIG. 6C is a schematic diagram of an application scenario of a paste squeeze device playing information of interest according to another exemplary embodiment. The control of the paste squeeze device of this embodiment can be applied to a control unit (for example, micro-processing unit, MCU, etc.) of the paste squeeze device. The paste squeeze device includes a storage part of at least one type of paste, and a paste squeeze controller provided on the storage part. As shown in FIGS. 6B and 6C, the paste squeeze device is further provided with a microphone 610 and a speaker 620.

As shown in FIG. 6A, the method includes following steps S601-S605.

In step S601, identity information of a user approaching the paste squeeze device is identified.

In step S602, target usage information corresponding to the identity information is acquired. The target usage information includes a target paste type and a target usage amount. On this basis, it may also include a target type of information of interest.

In step S603, the paste squeeze controller on the storage part storing a paste of the target paste type is controlled to squeeze out a paste of the target usage amount.

For relevant explanations and descriptions of steps S61-S603, reference may be made to the foregoing embodiment, and details are not described herein.

In step S604, information of interest of the target type is acquired when a voice instruction for playing information of interest is received through the microphone.

For example, the target type includes at least one of news, weather, schedule information, wearing recommendation information, and rain gear carrying reminder information, which is not limited in the present embodiment.

In step S605, information of interest of the target type is played through the speaker.

In an embodiment, after information of interest of the target type is acquired, the information of interest of the target type may be played through the speaker 620.

For example, as shown in FIG. 6B, the paste squeeze device can link a calendar in the electronic device (e.g., smartphone, etc.) of the user, and then broadcast the today's schedule of the user, and can recommend toothpaste or dress, or reminders such as whether to take umbrellas according to the schedule.

As shown in FIG. 6C, after the target type of information of interest corresponding to the identity information is acquired, if a voice instruction, such as "play today's news", for playing information of interest is received through the microphone, then it may be broadcasted to the user in response to the voice instruction.

As can be seen from the above description, in this embodiment, information of interest of the target type is acquired when a voice instruction for playing information of interest is received through the microphone, and information of interest of the target type matching the user may be played through the speaker. In this way, information of interest may be broadcasted to the user by reasonably using the time when the user uses the paste, which can improve the user experience.

Figure 7:
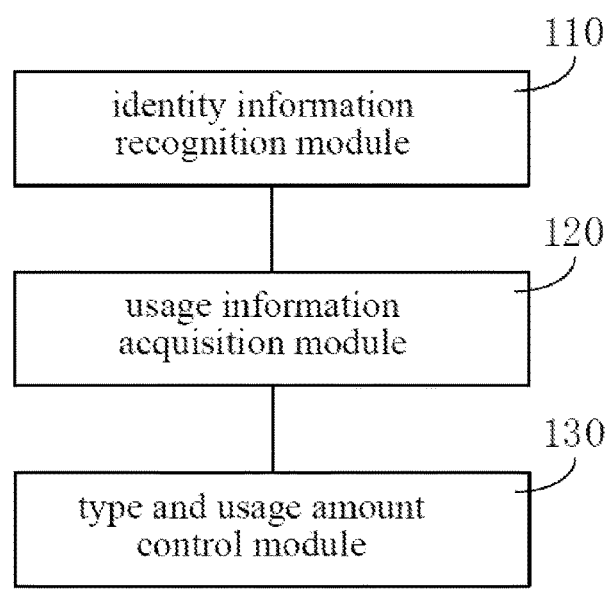
FIG. 7 is a block diagram of an apparatus for controlling a paste squeeze device according to an exemplary embodiment.

FIG. 7 is a block diagram of an apparatus for controlling a paste squeeze device according to an exemplary embodiment. The paste squeeze device includes a storage part of at least one type of paste, and a paste squeeze controller provided on the storage part. As shown in FIG. 7, the apparatus includes: an identity information recognition module 110, a usage information acquisition module 120, and a type and usage amount control module 130.

The identity information recognition module 110 is configured to identify identity information of a user approaching the paste squeeze device.

The usage information acquisition module 120 is configured to acquire target usage information corresponding to the identity information. The target usage information includes a target paste type and a target usage amount.

The type and usage amount control module 130 is configured to control the paste squeeze controller on the storage part storing a paste of the target paste type to squeeze out a paste of the target usage amount.

As can be seen from the above description, in this embodiment, by identifying identity information of a user approaching the paste squeeze device, and acquiring target usage information corresponding to the identity information, the target usage information including a target paste type and a target usage amount, it may achieve controlling the paste squeeze controller on the storage part storing a paste of the target paste type to squeeze out a paste of the target usage amount. Since the corresponding target usage information is acquired based on identity information of the user, it can achieve controlling the paste squeeze controller on the corresponding storage part to squeeze out the paste of a target usage amount based on the identity information of different users. Compared with the traditional way of squeezing out toothpaste by manual and mechanical transmission, it can reasonably control the type and usage amount of squeezing the paste, avoid squeezing out the amount of the paste less or more, and satisfy paste usage demand of the user.

Figure 8:
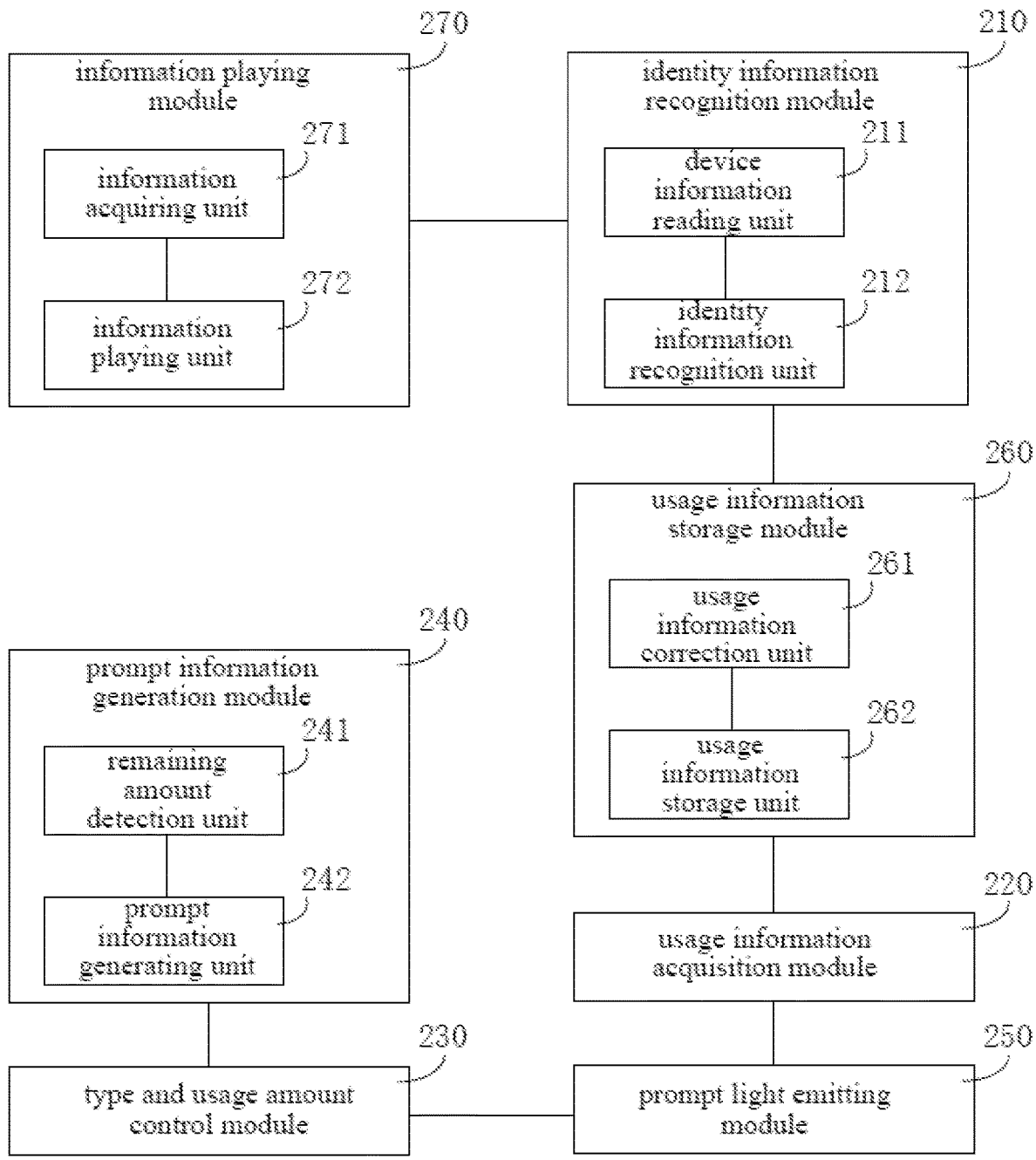
FIG. 8 is a block diagram of an apparatus for controlling a paste squeeze device according to another exemplary embodiment.

FIG. 8 is a block diagram of an apparatus for controlling a paste squeeze device according to another exemplary embodiment. The paste squeeze device includes a storage part of at least one type of paste, and a paste squeeze controller provided on the storage part. In the embodiment, an identity information recognition module 210, a usage information acquisition module 220, and a type and usage amount control module 230 have the same functions as the identity information recognition module 110, usage information acquisition module 120, and type and usage amount control module 130 in the foregoing embodiment shown in FIG. 7, which will not be repeated herein.

In this embodiment, the storage part is further provided with a paste remaining amount detection part. As shown in FIG. 8, the above apparatus may further include a prompt information generation module 240.

The prompt information generation module 240 may include:
   a remaining amount detection unit 241, configured to detect a paste remaining amount in the storage part based on the paste remaining amount detection part;
   a prompt information generating unit 242, configured to generate prompt information for prompting the user insufficiency of the paste remaining amount, when it is detected that the paste remaining amount is less than or equal to a remaining amount threshold.

In an embodiment, a projection lamp and an infrared sensor are provided at a set position on the storage part beside a paste outlet.

The control apparatus may further include:

a prompt light emitting module 250, configured to emit a prompt light for prompting to place an object at an aligned position of the paste outlet by the projection lamp, when the infrared sensor detects that the object for receiving the paste approaches.

On basis of this, the type and usage amount control module 230 may be further configured to perform the operation of controlling the paste squeeze controller on the storage part storing a paste of the target paste type to squeeze out a paste of the target usage amount, when it is detected that the object has been placed at the aligned position of the paste outlet.

In an embodiment, the identity information recognition module 210 may include:
a device information reading unit 211, configured to read device information of a wearable device, when it is detected that a user carrying the wearable device approaches the paste squeeze device;
an identity information recognition unit 212, configured to identify the identity information of the user based on the device information.

In an embodiment, the above apparatus may further include a usage information storage module 260;
the usage information storage module 260 may include:
a usage information correction unit 261, configured to correct the target usage information based on user operations;
a usage information storage unit 262, configured to store the corrected target usage information, to be associated with the user identity information.

In an embodiment, the paste squeeze device is further provided with a microphone and a speaker. The target usage information further includes a target type of information of interest, and the target type includes at least one of news, weather, schedule information, wearing recommendation information, and rain gear carrying reminder information.

On basis of this, the apparatus may further include an information playing module 270.

The information playing module 270 may include:
an information acquiring unit 271, configured to acquire information of interest of the target type when a voice instruction for playing information of interest is received through the microphone;
an information playing unit 272, configured to play information of interest of the target type through the speaker.

Regarding the apparatus in the above embodiment, the specific manner in which each module performs operations has been described in detail in the embodiment related to the method, and will not be elaborated herein.

Various embodiments of the present disclosure can have one or more of the following advantages.

By identifying identity information of a user approaching the paste squeeze device, and acquiring target usage information corresponding to the identity information, the target usage information including a target paste type and a target usage amount, it may achieve controlling the paste squeeze controller on the storage part storing a paste of the target paste type to squeeze out a paste of the target usage amount. Since the corresponding target usage information is acquired based on identity information of the user, it can achieve controlling the paste squeeze controller on the corresponding storage part to squeeze out the paste of a target usage amount based on the identity information of different users. Compared with the traditional way of squeezing out toothpaste by manual and mechanical transmission, it can reasonably control the type and usage amount of squeezing the paste, avoid squeezing out the amount of the paste less or more, and satisfy paste usage demand of the user.

Figure 9:
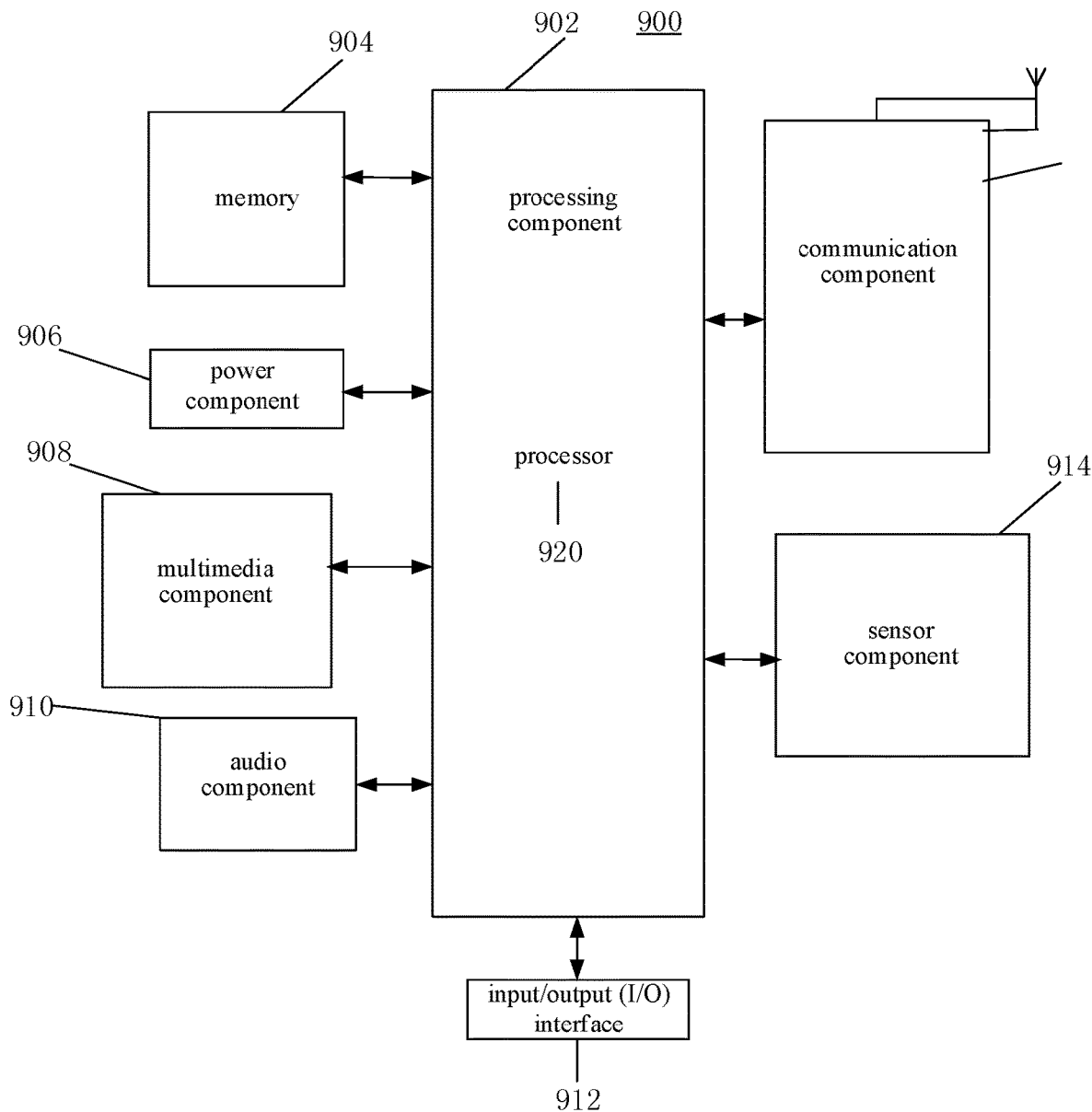
FIG. 9 is a block diagram of an electronic device according to an exemplary embodiment.

FIG. 9 is a block diagram showing a device 900 according to an exemplary embodiment. For example, the device 900 may be a mobile phone, computer, digital broadcasting terminal, messaging device, game console, tablet device, medical device, fitness device, personal digital assistant, etc.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls the overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules to facilitate the interaction between the processing component 902 and other components. For example, the processing component 902 can include a multimedia module to facilitate the interaction between the multimedia component 908 and the processing component 902.

The memory 904 is configured to store various types of data to support the operation of the device 900. Examples of such data include instructions for any application or method operated on the device 900, such as the contact data, the phone book data, messages, pictures, videos, and the like. The memory 904 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 can include a power management system, one or more power sources, and other components associated with the generation, management, and distribution of power in the device 900.

The multimedia component 908 includes a screen providing an output interface between the device 900 and the user. In some embodiments, the screen can include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. When the device 900 is in an operation mode, such as a photographing mode or a video mode, the front camera and/or the rear camera can receive external multimedia datum. Each of the front camera and the rear camera may be a fixed optical lens system or have focus and optical zoom capability.

The audio component 910 is configured to output and/or input an audio signal. For example, the audio component 910 includes a microphone (MIC) configured to receive an external audio signal when the device 900 is in an operation mode, such as a call mode, a recording mode, and a voice recognition mode. The received audio signal may be further stored in the memory 904 or sent via the communication component 916. In some embodiments, the audio component 910 also includes a speaker for outputting the audio signal.

The I/O interface 912 provides an interface between the processing component 902 and peripheral interface modules, such as a keyboard, a click wheel, buttons, and the like. These buttons may include, but are not limited to, a home button, a volume button, a starting button, and a locking button.

The sensor component 914 includes one or more sensors for providing status assessments of various aspects of the device 900. For example, the sensor component 914 can detect an open/closed status of the device 900, relative positioning of components, such as the display and the keypad of the device 900. The sensor component 914 can also detect a change in position of one component of the device 900 or the device 900, the presence or absence of user contact with the device 900, an orientation, or an acceleration/deceleration of the device 900, and a change in temperature of the device 900. The sensor component 914 can also include a proximity sensor configured to detect the presence of nearby objects without any physical contact. The sensor component 914 can also include a light sensor, such as a CMOS or CCD image sensor, configured to use in imaging applications. In some embodiments, the sensor component 914 can also include an accelerometer sensor, a gyroscope sensor, a magnetic sensor, a pressure sensor, or a temperature sensor.

The communication component 916 is configured to facilitate wired or wireless communication between the device 900 and other devices. The device 900 can access a wireless network based on a communication standard, such as Wi-Fi, 2G, 3G, 4G or 5G or a combination thereof. In an exemplary embodiment, the communication component 916 receives broadcast signals or broadcast associated information from an external broadcast management system via a broadcast channel. In an exemplary embodiment, the communication component 916 also includes a near field communication (NFC) module to facilitate short-range communications. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the device 900 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components, to perform the methods for controlling a paste squeeze device described above.

In an exemplary embodiment, there is also provided a non-transitory computer-readable storage medium including instructions, such as a memory 904 including instructions executable by the processor 920 of the device 900 to perform the methods for controlling a paste squeeze device described method. For example, the non-transitory computer readable storage medium may be a ROM, a random access memory (RAM), a CD-ROM, a magnetic tape, a floppy disc, and an optical data storage device, or the like.

In an embodiment, the storage part is further provided with a paste remaining amount detection part;
the method further includes:
detecting a paste remaining amount in the storage part based on the paste remaining amount detection part;
generating prompt information for prompting the user insufficiency of the paste remaining amount, when it is detected that the paste remaining amount is less than or equal to a remaining amount threshold.

In an embodiment, a projection lamp and an infrared sensor are provided at a set position on the storage part beside a paste outlet;
the method further includes:
emitting a prompt light for prompting to place an object at an aligned position of the paste outlet through the projection lamp, when the infrared sensor detects that the object for receiving the paste approaches;
performing the operation of controlling the paste squeeze controller on the storage part storing a paste of the target paste type to squeeze out a paste of the target usage amount, when it is detected that the object has been placed at the aligned position of the paste outlet.

In an embodiment, the identifying identity information of a user approaching the paste squeeze device includes:
reading device information of a wearable device, when it is detected that a user carrying the wearable device approaches the paste squeeze device;
identifying the identity information of the user based on the device information.

In an embodiment, the method further includes:
correcting the target usage information based on user operations;
storing the corrected target usage information, to be associated with the user identity information.

In an embodiment, the paste squeeze device is further provided with a microphone and a speaker, the target usage information further includes a target type of information of interest, and the target type includes at least one of news, weather, schedule information, wearing recommendation information, and rain gear carrying reminder information;
the method further includes:
acquiring information of interest of the target type when a voice instruction for playing information of interest is received through the microphone;
playing information of interest of the target type through the speaker.

In an embodiment, the storage part is further provided with a paste remaining amount detection part;
the apparatus further includes a prompt information generation module;
the prompt information generation module includes:
a remaining amount detection unit, configured to detect a paste remaining amount in the storage part based on the paste remaining amount detection part;
a prompt information generating unit, configured to generate prompt information for prompting the user insufficiency of the paste remaining amount, when it is detected that the paste remaining amount is less than or equal to a remaining amount threshold.

In an embodiment, a projection lamp and an infrared sensor are provided at a set position on the storage part beside a paste outlet;
the apparatus further includes:
a prompt light emitting module, configured to emit a prompt light for prompting to place an object at an aligned position of the paste outlet by the projection lamp, when the infrared sensor detects that the object for receiving the paste approaches;

the type and usage amount control module is further configured to perform the operation of controlling the paste squeeze controller on the storage part storing a paste of the target paste type to squeeze out a paste of the target usage amount, when it is detected that the object has been placed at the aligned position of the paste outlet.

In an embodiment, the identity information recognition module includes:

a device information reading unit, configured to read device information of a wearable device, when it is detected that a user carrying the wearable device approaches the paste squeeze device;

an identity information recognition unit, configured to identify the identity information of the user based on the device information.

In an embodiment, the apparatus further includes a usage information storage module;

the usage information storage module includes:

a usage information correction unit, configured to correct the target usage information based on user operations;

a usage information storage unit, configured to store the corrected target usage information, to be associated with the user identity information.

In an embodiment, the paste squeeze device is further provided with a microphone and a speaker, the target usage information further includes a target type of information of interest, and the target type includes at least one of news, weather, schedule information, wearing recommendation information, and rain gear carrying reminder information;

the apparatus further includes an information playing module;

the information playing module includes:

an information acquiring unit, configured to acquire information of interest of the target type when a voice instruction for playing information of interest is received through the microphone;

an information playing unit, configured to play information of interest of the target type through the speaker.

In an embodiment, the storage part is further provided with a paste remaining amount detection part;

the processor is further configured to perform:

detecting a paste remaining amount in the storage part based on the paste remaining amount detection part;

generating prompt information for prompting the user insufficiency of the paste remaining amount, when it is detected that the paste remaining amount is less than or equal to a remaining amount threshold.

In an embodiment, a projection lamp and an infrared sensor are provided at a set position on the storage part beside a paste outlet;

the processor is further configured to:

emitting a prompt light for prompting to place an object at an aligned position of the paste outlet through the projection lamp, when the infrared sensor detects that the object for receiving the paste approaches;

performing the operation of controlling the paste squeeze controller on the storage part storing a paste of the target paste type to squeeze out a paste of the target usage amount, when it is detected that the object has been placed at the aligned position of the paste outlet.

In an embodiment, the identifying identity information of a user approaching the paste squeeze device includes:

reading device information of a wearable device, when it is detected that a user carrying the wearable device approaches the paste squeeze device;

identifying the identity information of the user based on the device information.

In an embodiment, the processor is further configured to perform:

acquiring paste usage data at this time, the paste usage data including at least one of paste squeeze time, target usage amount and target paste type;

storing the paste usage data to a target device, the target device including a local device and/or a terminal device associated with the wearable device.

In an embodiment, the paste squeeze device is further provided with a microphone and a speaker, the target usage information further includes a target type of information of interest, and the target type includes at least one of news, weather, schedule information, wearing recommendation information, and rain gear carrying reminder information;

the processor is further configured to perform:

acquiring information of interest of the target type when a voice instruction for playing information of interest is received through the microphone;

playing information of interest of the target type through the speaker.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms, and these phrases may be interchangeably used.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for controlling a paste squeeze device, wherein the paste squeeze device comprises a storage part of at least one type of paste, and a paste squeeze controller provided on the storage part;
the method comprising:
identifying identity information of a user approaching the paste squeeze device;
acquiring target usage information corresponding to the identity information, the target usage information comprising a target paste type and a target usage amount;
controlling the paste squeeze controller on the storage part storing a paste of the target paste type to squeeze out a paste of the target usage amount;
correcting the target usage information based on user operations; and
storing the corrected target usage information, to be associated with the user identity information.

2. The method according to claim 1, wherein the storage part is further provided with a paste remaining amount detection part;
the method further comprising:
detecting a paste remaining amount in the storage part based on the paste remaining amount detection part; and
generating prompt information for prompting the user insufficiency of the paste remaining amount, when it is detected that the paste remaining amount is less than or equal to a remaining amount threshold.

3. The method according to claim 1, wherein a projection lamp and an infrared sensor are provided at a set position on the storage part beside a paste outlet;
the method further comprising:
emitting a prompt light for prompting to place an object at an aligned position of the paste outlet through the projection lamp, when the infrared sensor detects that the object for receiving the paste approaches; and performing the operation of controlling the paste squeeze controller on the storage part storing a paste of the target paste type to squeeze out a paste of the target usage amount, when it is detected that the object has been placed at the aligned position of the paste outlet.

4. The method according to claim 1, wherein the identifying identity information of a user approaching the paste squeeze device comprises:

reading device information of a wearable device, when it is detected that a user carrying the wearable device approaches the paste squeeze device; and identifying the identity information of the user based on the device information.

5. The method according to claim 1, wherein the paste squeeze device is further provided with a microphone and a speaker, the target usage information further comprises a target type of information of interest, and the target type comprises at least one of news, weather, schedule information, wearing recommendation information, and rain gear carrying reminder information;

the method further comprising:

acquiring information of interest of the target type when a voice instruction for playing information of interest is received through the microphone; and playing information of interest of the target type through the speaker.

6. A control device for controlling a paste squeeze device, wherein the paste squeeze device comprises a storage part of at least one type of paste, and a paste squeeze controller provided on the storage part;

wherein the control device comprises:

a processor, and memory storing instructions executable by the processor, wherein the processor is configured to perform:

identifying identity information of a user approaching the paste squeeze device;

acquiring target usage information corresponding to the identity information, the target usage information comprising a target paste type and a target usage amount;

controlling the paste squeeze controller on the storage part storing a paste of the target paste type to squeeze out a paste of the target usage amount;

correcting the target usage information based on user operations; and storing the corrected target usage information, to be associated with the user identity information.

7. The control device according to claim 6, wherein the storage part is further provided with a paste remaining amount detection part;

the processor is further configured to perform:

detecting a paste remaining amount in the storage part based on the paste remaining amount detection part; and generating prompt information for prompting the user insufficiency of the paste remaining amount, when it is detected that the paste remaining amount is less than or equal to a remaining amount threshold.

8. The control device according to claim 6, wherein a projection lamp and an infrared sensor are provided at a set position on the storage part beside a paste outlet;

the processor is further configured to perform:

emitting a prompt light for prompting to place an object at an aligned position of the paste outlet through the projection lamp, when the infrared sensor detects that the object for receiving the paste approaches; and performing the operation of controlling the paste squeeze controller on the storage part storing a paste of the target paste type to squeeze out a paste of the target usage amount, when it is detected that the object has been placed at the aligned position of the paste outlet.

9. The control device according to claim 6, wherein the identifying identity information of a user approaching the paste squeeze device comprises:

reading device information of a wearable device, when it is detected that a user carrying the wearable device approaches the paste squeeze device; and identifying the identity information of the user based on the device information.

10. The control device according to claim 9, wherein the processor is further configured to perform:

acquiring paste usage data at this time, the paste usage data comprising at least one of paste squeeze time, target usage amount and target paste type; and storing the paste usage data to a target device, the target device comprising a local device and/or a terminal device associated with the wearable device.

11. The control device according to claim 6, wherein the paste squeeze device is further provided with a microphone and a speaker, the target usage information further comprises a target type of information of interest, and the target type comprises at least one of news, weather, schedule information, wearing recommendation information, and rain gear carrying reminder information;

the processor is further configured to perform:

acquiring information of interest of the target type when a voice instruction for playing information of interest is received through the microphone; and playing information of interest of the target type through the speaker.

12. A non-transitory computer-readable storage medium having instructions stored thereon for execution by a processing circuit to perform:

identifying identity information of a user approaching the paste squeeze device;

acquiring target usage information corresponding to the identity information, the target usage information comprising a target paste type and a target usage amount;

controlling the paste squeeze controller on the storage part storing a paste of the target paste type to squeeze out a paste of the target usage amount;

correcting the target usage information based on user operations; and storing the corrected target usage information, to be associated with the user identity information.

13. An apparatus implementing the method of claim 1, configured to provide paste to a plurality of users, comprising the paste squeeze device, wherein the apparatus is configured to:

provide paste of specified types and target usage amounts based on identity information of the plurality users specific to each user.

14. The apparatus of claim 13, wherein the apparatus is a set of devices including a plurality of wearable devices configured to provide corresponding identity information of the plurality of users wirelessly to the paste squeeze device.

15. The apparatus of claim 14, further comprising a plurality of containers having a plurality of types of paste, wherein the apparatus is configured to automatically select the target paste type among the plurality of types of paste and squeeze out the selected target paste of the target usage amount specific to the user approaching.

16. The apparatus of claim 15, wherein the plurality of types of paste comprise at least a plurality of types of toothpaste, a plurality of types of shampoo, a plurality of types of facial cleanser, and a plurality of types of liquid soap.

17. The apparatus of claim 16, further comprising:
a projection lamp configured to emit a prompt light for prompting the approaching user to place an object at an aligned position of a paste outlet; and
an infrared sensor configured to detect that the object for receiving the paste approaches the aligned position.

18. The apparatus of claim 17, further comprising a speaker configured to automatically play information of interest to the user approaching.

\* \* \* \* \*